L. F. Frazee,
Clothes Frame

Nº 31,538.   Patented Feb. 26, 1861.

Witnesses.
Chas W Thompson
H. James Weston

Inventor
Lawrence F Frazee
By Thad. How
Atty

UNITED STATES PATENT OFFICE.

LAWRENCE F. FRAZEE, OF TOTTENVILLE, NEW YORK.

CLOTHES-FRAME.

Specification of Letters Patent No. 31,538, dated February 26, 1861.

*To all whom it may concern:*

Be it known that I, LAWRENCE F. FRAZEE, of Tottenville, in the county of Richmond and State of New York, have invented an Improved Clothes-Horse, the construction and operation of which I have described in the following specification and illustrated in its accompanying drawings with sufficient clearness to enable competent and skilful workmen in the arts to which it pertains or is most nearly allied to make and use my invention.

My said invention consists in the arrangement of parts hereinafter described of a folding clothes horse, by which I am enabled to furnish a more convenient and serviceable article than has been heretofore produced for that purpose.

Figure 1:
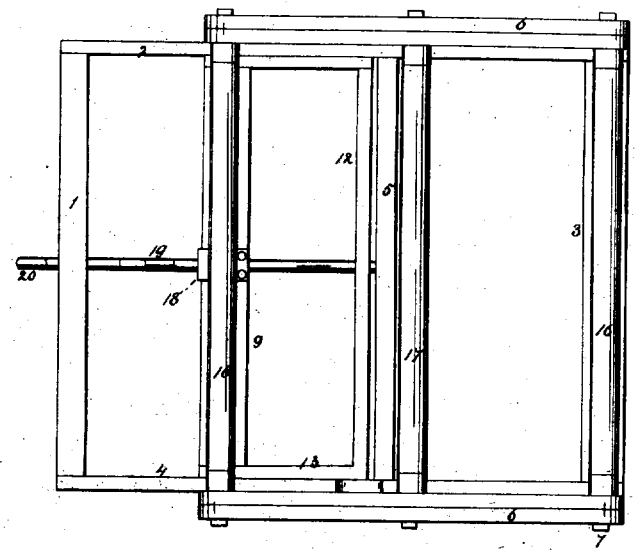
Figure 2:
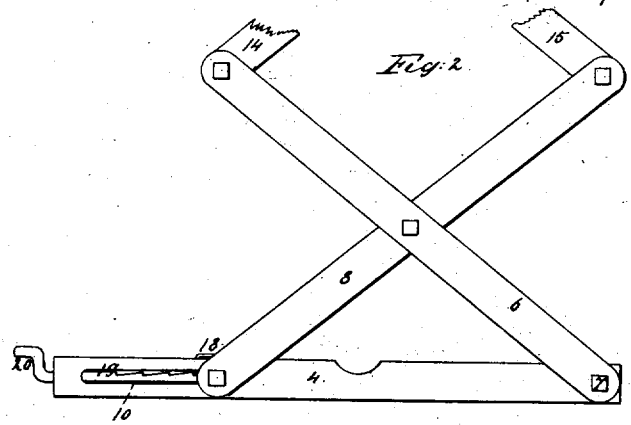
Figure 3:
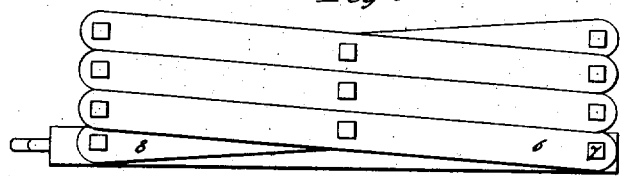

In the accompanying drawings, Figure 1 is a plan of my improved clothes horse spread to its fullest extent. Fig. 2 is a side elevation of the lower portion of it, the upper parts being broken away to save unnecessary use of room and the repetition of the representation of parts. Fig. 3 is a side elevation of the whole clothes horse the joints being folded together into the most compact form.

The folding portions are supported upon a substantial frame formed of the pieces 1, 2, 3, 4, and 5, the arms 6, being jointed to the pieces 2, and 4, at 7 as shown, and the arms 8 being connected by means of a rod or bar 9, which extends across the machine for that purpose, and is allowed to slide in the slots or mortises 10, for the purpose of adjusting the clothes horse or frame to the desired height. The bar 9 is framed to the pieces 11, 12, and 13, which form a frame of sufficient stability to secure proper action. This frame slides bodily in the frame which forms the base of the machine. The arms 6, 8, 14, 15, etc., constitute a series which are connected by the round bars 16, 17, in such a manner as to allow them to fold upon each other as indicated by the different positions shown, the arms 16, uniting them at the ends, and the arms 17, uniting them in the middle. These joints may be multiplied *ad infinitum* thereby constituting a frame which may be run up to any desired height.

Catch 18, and ratchet bar 19, furnish the means of adjusting the frame, to the height desired, the catch having sufficient elasticity to rise over the ratchet teeth on the rod and descend again into the notches. This rod or ratchet bar 19 is made round at least at the ends, and terminates at the outer end in the crank 20, and as it has notches or teeth upon only one side of it, it is obvious that when the crank 20 is turned either into a horizontal position or so as to point downward the teeth will be in such a position as to clear the catch 18, and allow it to slide freely over the rod 19. The turning down of this crank as above indicated will either allow the frame to be folded down into its most compact form or into any intermediate position required.

In using this clothes horse the folding frame is unfolded slightly, or in other words the upper portion raised from its most compact position, so as to allow clothes to be conveniently hung upon the upper rods 16, and 17, and when these have been filled with clothes another elevation or vertical extension is given to the folding frame when the next set of bars is filled with clothes, and so on till all the bars if need be are covered with clothes, the frame being held in position at each successive elevation by the catch 18. In the mean time as the number and length of the joints is not limited, the first set may have been raised much above the reach of the operator, and by this arrangement a large amount of valuable room is obtained in very little horizontal space. The base of this clothes horse may be supported upon legs or other framing to bring it to a convenient height if desired. When it is desirable to lower the clothes for the purpose of removal, the crank 20, is turned sufficiently far to cause the notches or teeth to clear the catch 18, and the frame allowed to descend sufficiently far for the purpose desired, when the crank being again lifted, the frame is held in position.

I am aware that various clothes horses have been constructed which fold together for the purpose of giving compactness for the purpose of stowing them away in the least possible amount of room, and I am also aware that there are others in which the frame has been raised bodily up out of the way after the clothes have been put on. These do not however furnish the facilities which mine possesses for drying a great number of tiers of clothes one above the other, several of them perhaps far above the reach of the operator when the frame is entirely spread, and all easily brought within reach when desired.

Having thus described my invention I claim—

5 The arrangement of the frame 1, 2, 3, 4, 5, sliding bar 9, or its equivalent, arms 6, 8, 14, 15, etc., bars or rods 16, or 16, and 17, catch 18, and cranked shaft or rod 19 substantially as described for the purpose set forth.

LAWRENCE F. FRAZEE.

Witnesses:
H. JAMES WESTON,
THOS. P. HOW.